(12) United States Patent
Patel

(10) Patent No.: US 7,424,331 B2
(45) Date of Patent: Sep. 9, 2008

(54) SYSTEM FOR IMPLEMENTING INTELLIGENT AND ACCURATE UPDATES TO STATE-BASED ADVANCED PROCESS CONTROL (APC) MODELS

(75) Inventor: Nital S. Patel, Mesa, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 11/642,502

(22) Filed: Dec. 19, 2006

(65) Prior Publication Data

US 2008/0147225 A1   Jun. 19, 2008

(51) Int. Cl.
*G05B 13/02* (2006.01)
(52) U.S. Cl. ....................................... 700/31
(58) Field of Classification Search ............... 700/29, 700/31, 32, 45, 51, 108
See application file for complete search history.

(56) References Cited

U.S. PATENT DOCUMENTS

| | | | | |
|---|---|---|---|---|
| 6,470,230 | B1 * | 10/2002 | Toprac et al. | 700/121 |
| 7,200,459 | B1 * | 4/2007 | Bode et al. | 700/121 |
| 2005/0010319 | A1 * | 1/2005 | Patel et al. | 700/121 |
| 2006/0079983 | A1 * | 4/2006 | Willis | 700/108 |
| 2006/0271225 | A1 * | 11/2006 | Schulze et al. | 700/108 |
| 2007/0078556 | A1 * | 4/2007 | Stirton et al. | 700/108 |

OTHER PUBLICATIONS

Edgar et a.; "Model-Based Control in Microelectronis Manufacturing"; 1999 IEEE pp. 4185-4191.*
Qin et al.; "Semiconductro Manufacturing Process Control and Monitoring: A Fab-Wide Framework"; 2005 Elsevier pp. 179-191.*
Smith et al; "Run by Run Advanced Process Control of Metal Sputter Deposition"; 1998 IEEE;vol. 11 No. 2 pp. 276-284.*

\* cited by examiner

*Primary Examiner*—Albert DeCady
*Assistant Examiner*—Chad Rapp
(74) *Attorney, Agent, or Firm*—Blakely, Sokoloff, Taylor & Zafman LLP

(57) ABSTRACT

In one embodiment, an apparatus and method for implementing intelligent and accurate updates to state-based advanced process control (APC) models are disclosed. In one embodiment, the method comprises receiving at least one of a re-measurement or a data invalidation at a state-based advanced process control (APC) model, referencing a state value table and a state update table to determine the current state of lot measurements in the state-based APC model, updating the state value table and the state update table to reflect the at least one of the re-measurement or the data invalidation, and determining settings to apply to a lot at a process tool based on process variability patterns established by the state-based APC model from the updated values in the state value table and the state update table.

20 Claims, 8 Drawing Sheets

SYSTEM FOR IMPLEMENTING INTELLIGENT AND ACCURATE UPDATES TO STATE-BASED ADVANCED PROCESS CONTROL (APC) MODELS

FIELD OF THE INVENTION

The embodiments of the invention relate generally to the field of semiconductor fabrication and, more specifically, relate to implementing intelligent and accurate updates to state-based advanced process control (APC) models.

BACKGROUND

Advanced process control (APC) models for semiconductor manufacturing enable the reduction of process variability in semiconductor manufacturing processes. Two types of models utilized for APC include a feedback list approach and a state-based approach.

In the feedback list scenario, data at metrology upload is stored in a list sorted by process tool lot order. When a setting calculation is desired, the system performs the model update calculations on this list of values (e.g., an exponentially weighted moving average (EWMA) calculation to filter out the effect of noise). However, at no point is this calculated value stored back for use when the next lot arrives for processing. The model update calculation is repeated each time on this list of values only.

As a result, the feedback list approach cannot correctly deal with models requiring terms that depend on different contexts (i.e., partitions). The feedback list approach thereby results in a uniform partitioning structure. An excessively large number of partitions and APC performance deterioration may be a consequence due to data being binned across such a large number of partitions. In view of that, individual partitions are not updated frequently enough with new data to keep track of the process drift for controlling variability in the semiconductor processing system.

This former shortcoming makes the feedback list approach non-optimal in high-mix manufacturing, as it results in infrequent updates to low volume partitions and, accordingly, the need to run a large number of send-aheads. However, the feedback list approach does provide good support for handling issues such as re-measurement at metrology, data invalidation, and, if needed, enforcement of model updates to follow the order of processing. These are the primary reasons the feedback list approach is used for APC applications.

In the state-based APC model scenario, correct implementation of APC models that have different partitioning structures based on the components of variation may be achieved. State-based models offer a natural representation for tracking multiple sources of variation. In addition, the update algorithms used for these models are easier to tune than the feedback list approach (as state-based models follow the infinite form representation versus the finite form supported by feedback lists).

One way that state-based models accomplish these improvements over the feedback list approach is by providing for updating in the feedback path. However, updating in the feedback path can result in model update errors in the presence of re-measurements at metrology and data invalidations. Model update errors also arise in the state-based approach due to the fact that the update is in the order of metrology instead of the order of processing. These shortcomings make state-based APC models less robust in the semiconductor manufacturing domain.

Currently, there is no known solution for handling re-measurements and data invalidations for state-based APC models. This forces APC problems to be cast in the context of a feedback list, which, as discussed above, can be less desirable for implementation than the state-based APC models. A state-based APC model that can correctly handle re-measurements, data invalidation, and sequence updates in the order of processing to more accurately compute APC settings on the process tool would be beneficial.

BRIEF DESCRIPTION OF THE DRAWINGS

The invention will be understood more fully from the detailed description given below and from the accompanying drawings of various embodiments of the invention. The drawings, however, should not be taken to limit the invention to the specific embodiments, but are for explanation and understanding only.

DETAILED DESCRIPTION

A method and apparatus for implementing intelligent and accurate updates to state-based advanced process control (APC) models are described. In the following detailed description of the present invention, numerous specific details are set forth in order to provide a thorough understanding of the present invention. However, it will be apparent to one skilled in the art that the present invention may be practiced without these specific details. In other instances, well-known structures and devices are shown in block diagram form, rather than in detail, in order to avoid obscuring the present invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Embodiments of the invention provide for implementing intelligent and accurate updates to state-based APC models. Embodiments of the invention address the problem of correct implementation of state-based APC models for semiconductor manufacturing processes. Specifically, the embodiments of the invention enable state based APC models to correctly handle re-measurements, data invalidations, and, optionally, to sequence updates in the order of processing to more accurately compute APC settings on the process tool. These issues have been major stumbling blocks in the adoption of state-based APC models for semiconductor manufacturing, which offer the basis for advanced APC applications including correct implementation of advanced partitioning schemes.

Figure 1:
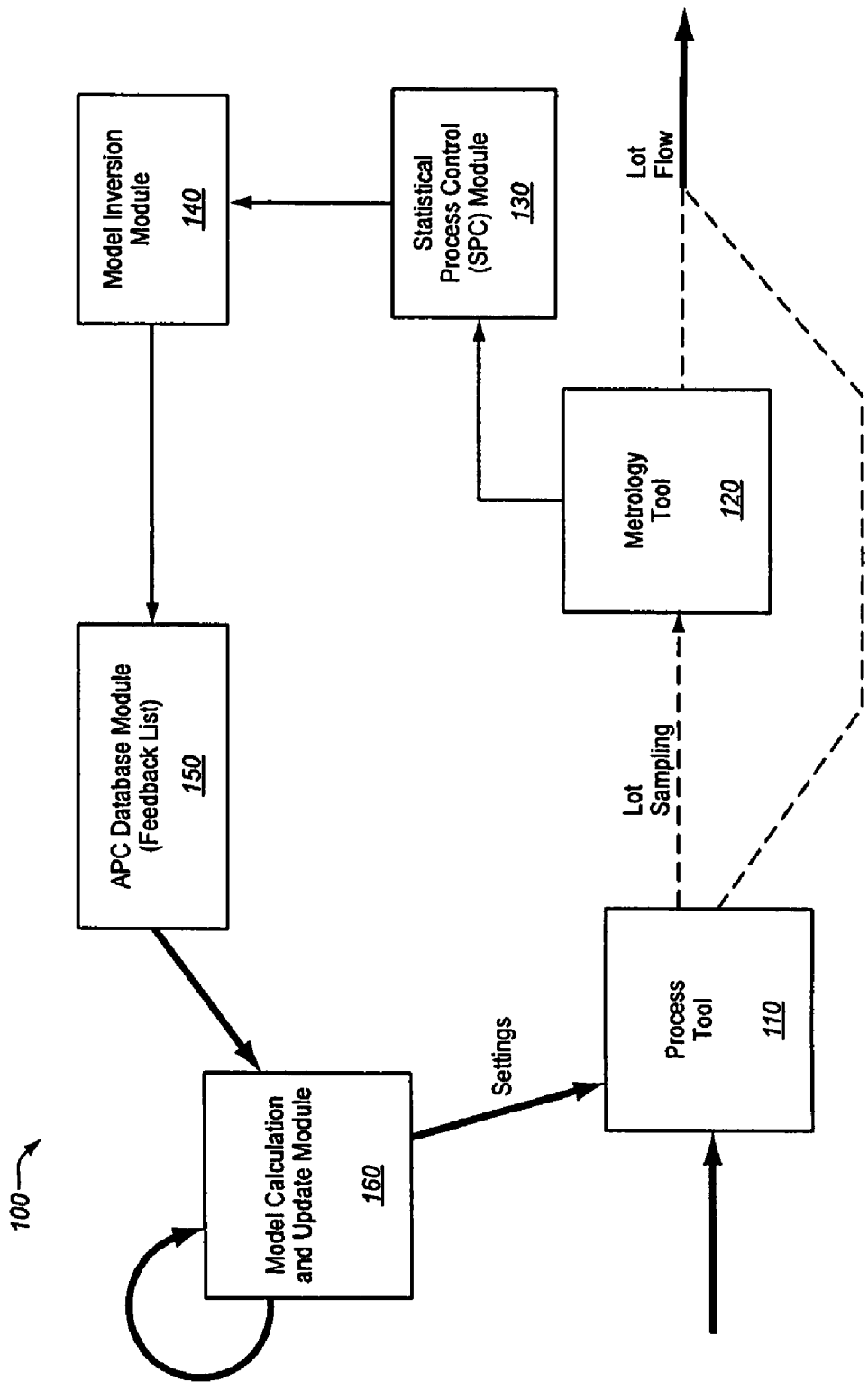
FIG. 1 illustrates a block diagram of one embodiment of a feedback list APC model.

FIG. 1 is a block diagram illustrating one embodiment of a feedback list approach in an APC model. The APC model 100 includes a process tool 110, a metrology tool 120, a statistical process control (SPC) module 130, a model inversion module 140, an APC database 150, and a model calculation and update module 160. In some embodiments, the APC model 100 may be a sub-component of a larger semiconductor fabrication process.

As shown in FIG. 1, the APC model utilizes a feedback list approach by implementing the APC database module 150 as a feedback list. The lot flow throughout the block diagram is depicted by the arrows. Thicker lines depict a high volume traffic flow, while the dashed and thinner lines depict a low volume traffic flow through the APC model 100. After processing at process tool 110, a lot may be selected for lot sampling at the metrology tool 120. Measurements from the metrology tool 120 are sent to the SPC module 130 for analysis.

The analysis results from SPC tool are then sent to the model inversion module 140, and subsequently to the APC feedback list database module 150. Model calculation and update module 160 utilizes the APC feedback list 150 for performing computations (e.g., EWMA calculations) and model updates on the prior lot data. The results from the model calculation and update module 160 are used to calculate new settings to apply to incoming lots at the process tool 110, in order to respond to and reduce process variability in the semiconductor manufacturing system.

In one embodiment, the feedback list approach employed by APC model 100 uses EWMA calculations by the model calculation and update module 160 on every setting request. Consequently, a drawback of the feedback list approach is that it may not correctly support models that call for comprehending multiple sources of variation. This may occur when one wants to apply the effect of a specific variation over all instances of another source. For example, a process may see variation due to differences in process equipment and due to product type. The correct feedback list solution would be to fully segregate (partition) the model to track the impact of all combinations of equipment and part type independently. Note, that in embodiments of the invention, partitioning refers to a designed separation in the model to account for sources of process variation.

This former shortcoming makes the feedback list APC model non-optimal in high-mix manufacturing as it results in infrequent updates to low volume partitions, and subsequently an obligation to run a large number of send-aheads. However, the feedback list approach does provide good support for handling issues such as re-measurements at the metrology tool, data invalidations, and, if needed, enforcement of model updates to follow the order of processing. These are the primary reasons a feedback list approach has been previously used for APC applications.

Figure 2:
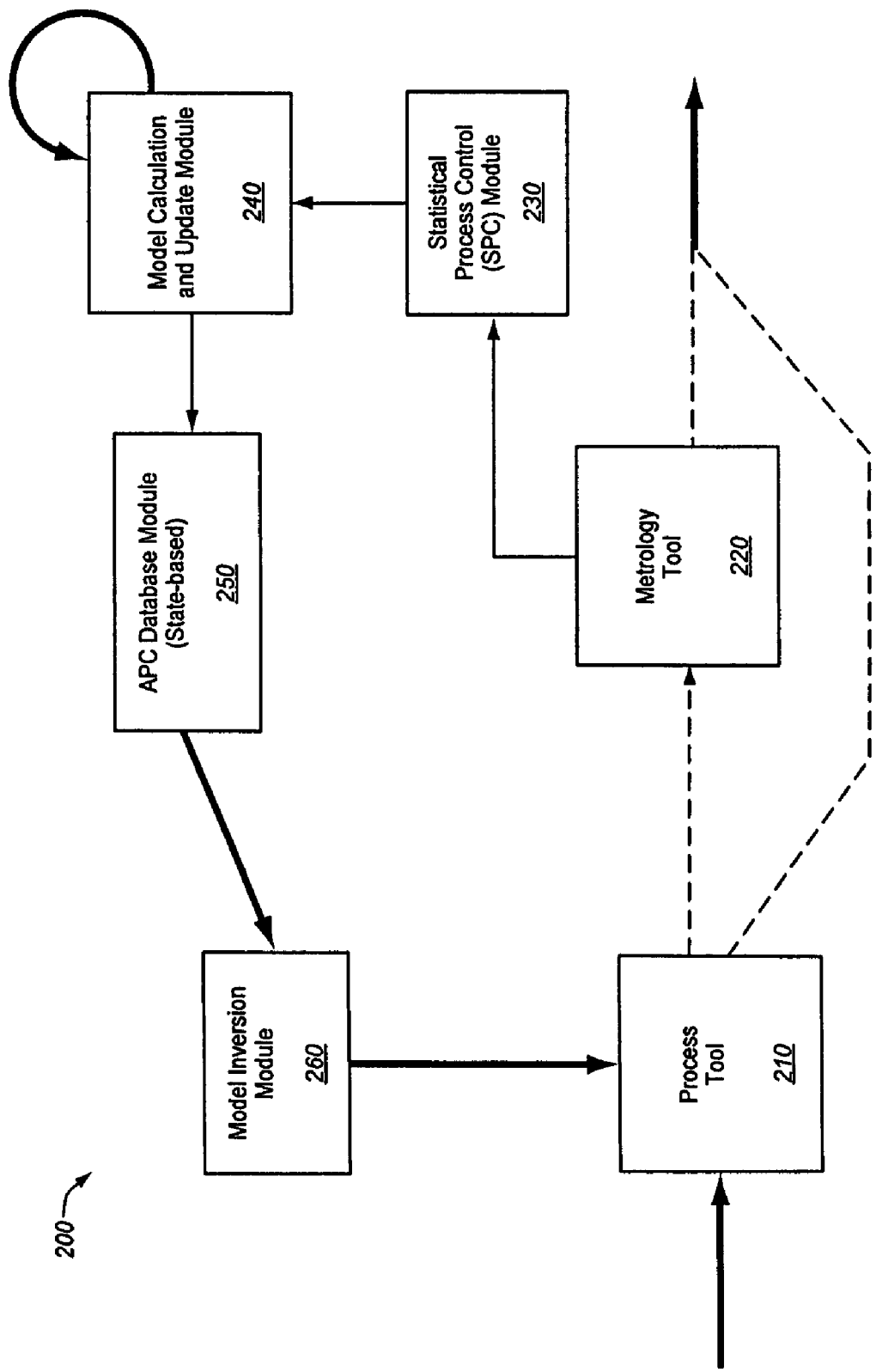
FIG. 2 is a block diagram of one embodiment of a state-based APC model.

FIG. 2 is a block diagram illustrating one embodiment of a state-based APC model. The state-based APC model 200 includes a process tool 210, a metrology tool 220, a SPC module 230, a model calculation and update module 240, an APC database 250, and a model inversion module 260. In some embodiments, the APC model 200 may be a sub-component of a larger semiconductor fabrication process.

As shown in FIG. 2, the APC model utilizes a state-based approach by implementing the APC database module 250 as a state-based model. The lot flow throughout the block diagram is depicted by the arrows. Thicker lines depict a high volume traffic flow, while the dashed and thinner lines depict a low volume traffic flow through the APC model 200. After processing at process tool 210, a lot may be selected for lot sampling at the metrology tool 220. Measurements from the metrology tool 220 are sent to the SPC module 230 for analysis.

The analysis results from SPC tool are then sent to the model calculation and update module 240, and subsequently sent to the APC state-based database module 250. Model calculation and update module 240 performs computations (e.g., EWMA calculations) and model updates on the present lot and any prior lot data. The results from the model calculation and update module 240 are used at the APC database 250 to determine new settings to apply to incoming lots at the process tool 210, in order to respond to and reduce process variability in the semiconductor manufacturing system. Prior to applying the new setting at process tool 210, model inversion model 260 selects the necessary data to apply at process tool 210.

In comparison to the feedback list approach, the state-based APC model 200 moves the less computationally-intensive model inversion module 260 into the path with higher transaction volume (i.e., setting calculations at the process tool) and moves the more computationally-intensive recursive model calculation and update module 240 into the lower volume feedback path. By moving the model updates (computationally intensive) to the feedback path, one does not hold up lot introductions on the process tool due to computation time. The feedback data path typically sees fewer transactions due to "skiplot" induced lot sampling. Moving the updates to this loop also makes sense in this context as it only fires the model update when new data is available from metrology, cutting down on computational burden.

Embodiments of the state-based APC model 200 offer a natural representation for tracking multiple sources of variation. State-based solutions allow for correctly implementing APC models that have different partitioning structures based on the components of variation. The feedback list solution incorrectly updates for models that do not follow a uniform partitioning. A fully-segregated model with process tool id, product id, and operation id as contexts would maintain a unique set of model estimates for each possible combination of these. On the other hand, a structure including a term that tracks only process tool-related offsets would result in models where the process tool estimated contributions to process disturbance are applied across all products and operations.

In addition, the update algorithms used for state-based APC models are easier to tune than the feedback list approach (as a state-based model follows the infinite form representation versus the finite form supported by feedback lists). State-based models also allow for implementation of sophisticated algorithms, such as on-line adaptive EWMA gain optimization, simultaneous update of multiple states (e.g. bias and sensitivity), and generation of partition level metrics that can be sourced to other fabrication systems (e.g., to dispatch). State-based models also allow for a configuration-driven APC development environment versus one that depends on scripting.

Figure 3:
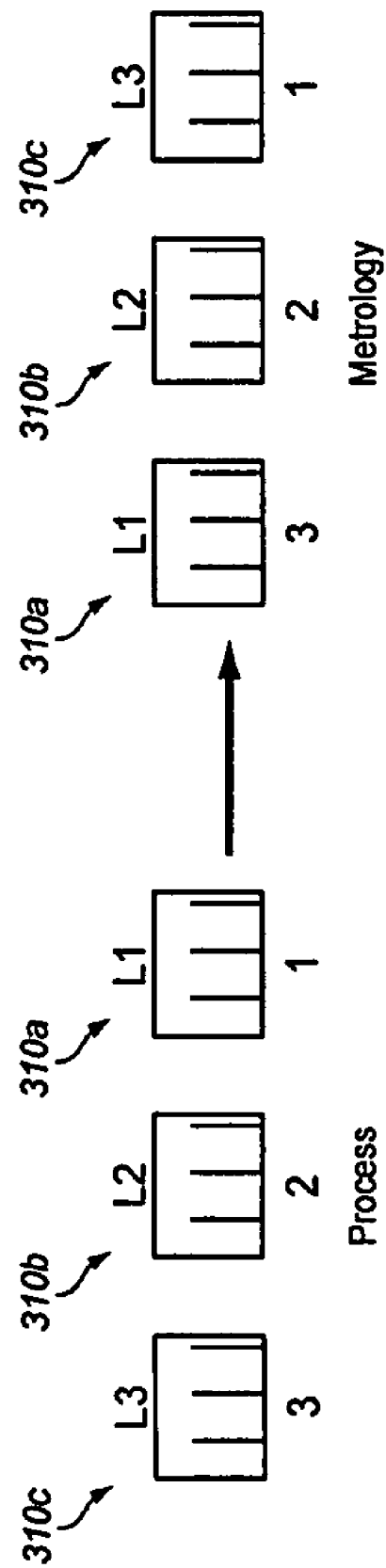
FIG. 3 is a block diagram illustrating one embodiment of out-of-order metrology versus processing.
Figure 4:
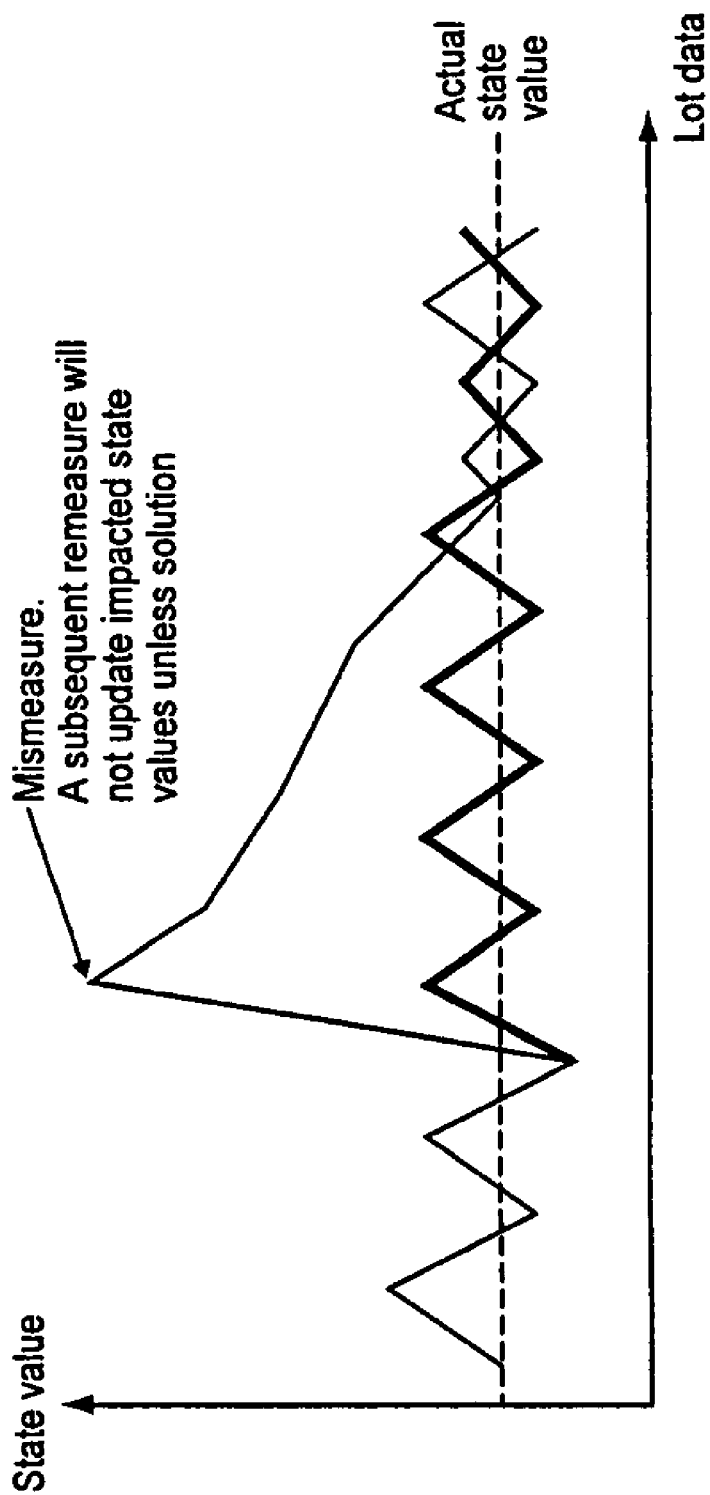
FIG. 4 is a graphical illustration of one embodiment of results from a state-based APC model.

However, the updating in the feedback path results in the state-based approach possibly inducing model update errors in the presence of re-measurements and data invalidations. Model update errors also arise in the state-based approach due to the update being in the order of metrology, instead of the order of processing. FIG. 3 illustrates the concept of the out-of-order updates in metrology versus processing. As shown, the lots 310a-c are processed in a first order, while the same lots may be measured at the metrology tool in a different order. Similarly, FIG. 4 shows how a state-based APC system may be thrown off track if re-measurements and data invalidations are not correctly handled. As shown, several additional lots are needed before the state value returns to being a good estimate of the true state.

Embodiments of the invention enable optimal implementation of state-based APC models by addressing these issues of re-measurement and data invalidations, and optionally, forcing updates to be ordered in the order the lots were processed. In addition, embodiments of the invention also handle manual model updates in a seamless fashion.

Figure 5:
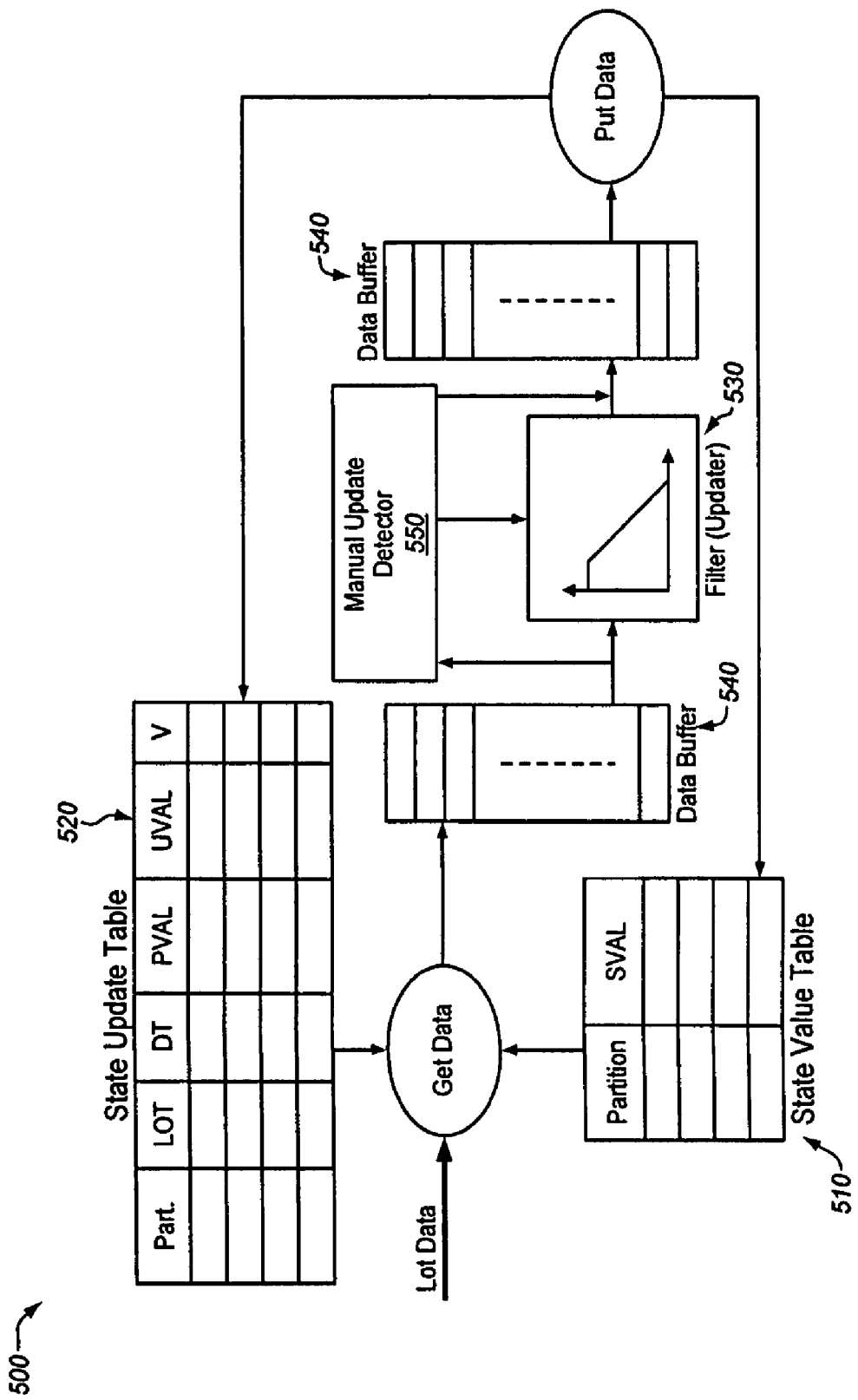
FIG. 5 is a block diagram of one embodiment of a state-based APC update model.

FIG. 5 is a block diagram illustrating a solution presented by embodiments of the invention to address the above-discussed drawbacks of the state-based APC model. As shown, state-based APC update model 500 includes are variety of components 510-550. In some embodiments, these components are located in the state-based APC database module 250 described with respect to FIG. 2. Other embodiments may additionally utilize the model calculation and update module 240 of FIG. 2 to implement the components of FIG. 5. FIG. 5 illustrates the primary signal flow paths between the various components within state-based APC update model 500.

As illustrated, two classes of database tables are implemented. One is the state value table 510. State value table 510 provides an instantaneous snapshot of the state-based APC model. Specifically, the state value table 510 holds the present state of the model and is queried for a partition-dependent value (e.g., for the SVAL entry) on settings calculations. For settings calculations, this table is queried and the resulting values are used to carry out a simple model inversion to compute the settings for the process tool.

The other table is a state update table 520 that tracks the history of the state updates for use by the system. The state update table 520 holds a compact update history of the states for use by an updater 530 to support the more accurate and intelligent updates mentioned above that embodiments of the invention provide.

In addition to the database tables 510, 520, a component designated as the updater (i.e., filter) 530 uses the data from the state value 510 and state update 520 tables to coordinate model updates to enforce re-measurement, data invalidation, and, optionally, to force correct update sequencing (i.e., matching the update order with the order of lot processing independently of the metrology order). In order to overcome the update robustness issues with prior state-based APC models, embodiments of the present invention utilize the updater 530 to augment the feedback path for state-based APC models.

The updater 530 uses the data stored in the state value table 510 and the state update table 520 to perform intelligent and accurate model updates in order to ensure that re-measurements and invalidations are correctly handled. In addition, an option is provided to force updates to be in the same order as lots were processed (synchronous updates) or to allow them to be in the order of metrology measurement (asynchronous updates).

Furthermore, embodiments of state-based APC update model 500 comprehend the impact of engineering-made manual adjustments to the APC model and may take appropriate action when these adjustments are detected. This is in contrast to the prior art feedback list approach where a manual update also involves manually clearing out the feedback data list. A manual update detector 550 protects manual updates by resetting the buffers 540 and discarding all history up to the manual update so that the updater 530 only looks in a forward direction.

Figure 6:
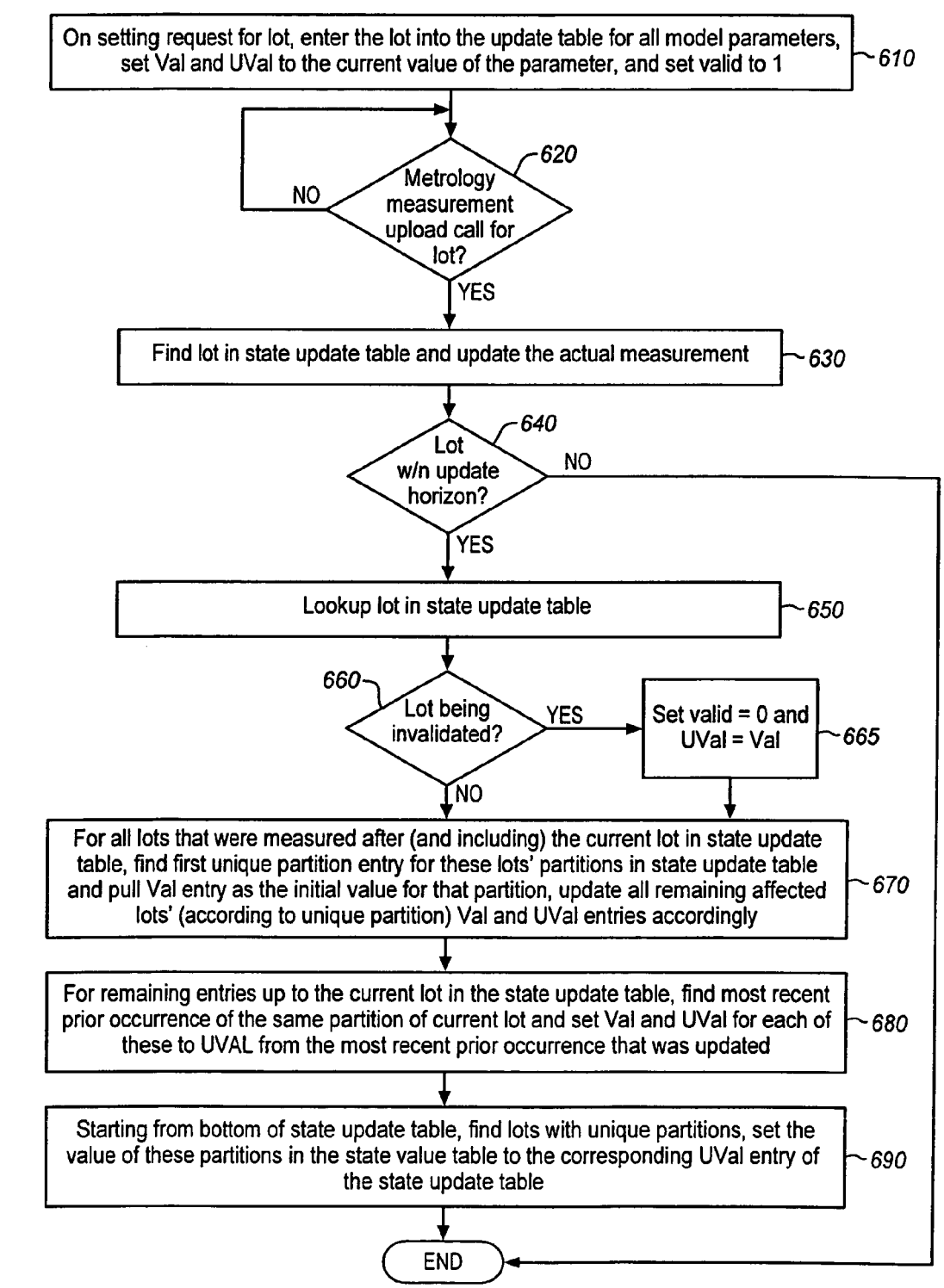
FIG. 6 is a flow diagram of a method of one embodiment of the invention.

FIG. 6 is a flow diagram representing a method according to embodiments of the invention. Process 600 provides a sequence of key logical steps that drive the overall behavior of embodiments of the invention. Process 600 depicts one embodiment of providing synchronous updates to a state-based APC model. Synchronous updates are utilized when the model updates iteratively, but all updates are sequenced in the same order as how the lots were processed on the process tool. In some embodiments, the components described with respect to FIG. 5 may be utilized to perform process 600. For instance, updater 530 of FIG. 5 may perform process 600 of FIG. 6.

Process 600 begins at processing block 610 where upon a settings request for a particular lot, the lot is entered into a state update table for all model parameters. The Val and UVal entries in the update table are set to the current value of the parameter and the valid entry is set to 1. Then, at decision block 620, it is determined whether a metrology measurement upload call for the lot is made. This call refers to the transaction via which metrology data is uploaded from the metrology tool, and in some cases the SPC system, to the APC model. If not, the process 600 waits until the metrology measurement upload call for the lot is made.

When a metrology measurement upload call for the lot is made, the lot is found in the state update table and its actual measurement(s) is updated, at processing block 630. Then, at decision block 640, it is determined whether the lot is within a pre-determined update horizon. This update horizon may be a statistically significantly period of time, or a certain number of lots measured from the target lot. If the lot is not in the update horizon, the process ends.

If the lot is in the update horizon, then at processing block 650, the lot is located in the state update table. At decision block 660, it is determined whether the lot is being invalidated. If so, the valid entry for that lot in the state update table is set to 0, and its UVal entry is set equal to the Val entry. Subsequently, the process continues to processing block 670.

However, if the lot is not being invalidated, then at processing block 670, for all lots in the state update table that were measured after (and including) the current lot in the metrology order, the first unique partition entry for these lots' partitions in the state update table is found and the associated Val entry is set as the initial value for that partition. Then, all of the remaining affected lots' Val and UVal entries are updated according to the updater (i.e., filter). At processing block 680, for the remaining entries up to the current lot in the state update table, the most recent prior occurrence of the same partition of the current lot are found in the state update table and the Val and UVal for each of these is set to the UVal from the most recent prior occurrence that was updated. Finally, at processing block 690, starting from the bottom of the state update table, the lots with unique partitions are found and the value of the partitions in the state value table are set to their corresponding UVal entry in the state update table.

Other embodiments of the invention also enable asynchronous updates to state-based APC models. The asynchronous updates are generally simpler to perform than the above-described synchronous updates. Asynchronous updates are utilized when the model updates as data comes in from the metrology tool. One difference from the synchronous updates process is that on the settings request for a lot, no action is needed. In addition, entries are added to the state update table only upon the measurement of the lot. As a result, there is less frequent revision of prior lot entries in the state update table than in the synchronous update scenario. This is because first time measurements do not affect prior measured lots. Also, measurements of a lot do not affect the prior processed lots that have not been measured yet, as they are not entered into the state update table yet.

In addition, the process 600 of FIG. 6 may additionally handle manual updates in embodiments of the invention, as mentioned previously. For manual updates operating in a synchronous update mode, if the most recent UVal in the state update table for a specific parameter or partition combination does not match the value in the state value table, then after replay and updating of the data that particular parameter/partition is not updated. On the other hand, if the Val value at time X of the parameter/partition does not match the UVal value, then during replay the Val value is retained for the entry at time X.

For manual updates operating in an asynchronous update mode, if the most recent pre-replay/update value in the state update table for a specific parameter/partition combination does match the value in the state value table, then after replay/update that parameter/partition is not updated. On the other hand, if the Val value at time X of the parameter/partition does not match the UVal value, then during replay retain the Val value for the entry at time X.

Figure 7:
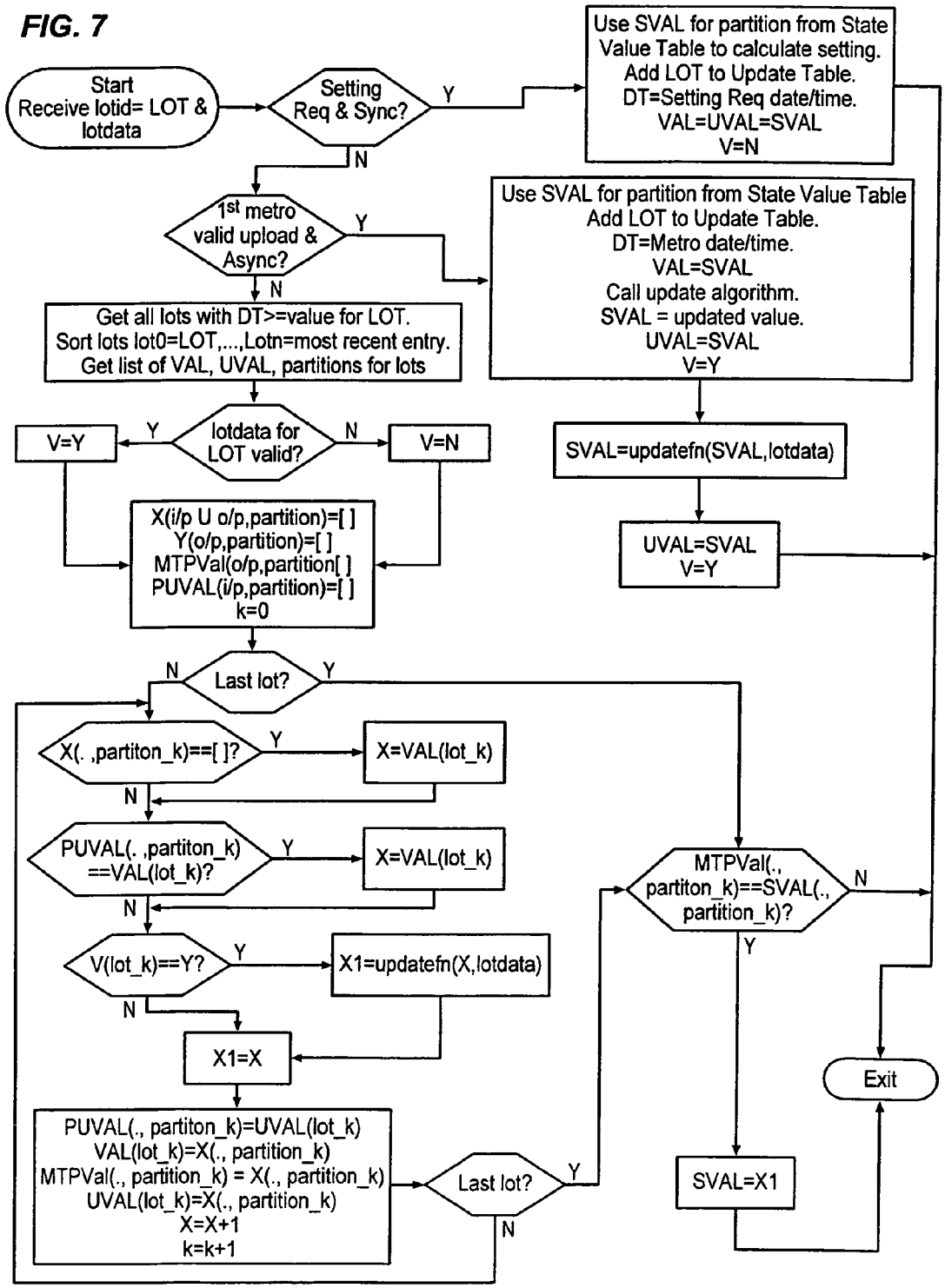
FIG. 7 is a flow diagram of one embodiment a pseudo-code implementation of providing updates to an APC model.

FIG. 7 is a flow diagram presenting one embodiment a pseudo-code implementation of the process 600 of FIG. 6. This pseudo-code flow diagram is presented to provide further implementation details for embodiments of the present invention. For reference purposes, the following definitions of terms used in the pseudo-code flow are provided. 'LOT' is the lot identification of the present lot. 'Sync' depicts that updates are ordered in the order of lots processed. 'Async' depicts that the updates are ordered in the order of lots measured. 'DT' is the date/time stamp value. 'SVAL' is the value from the state value table. 'VAL' is the current basis value from the state update table. 'UVAL' is the updated value from the state update table.

Figure 8:
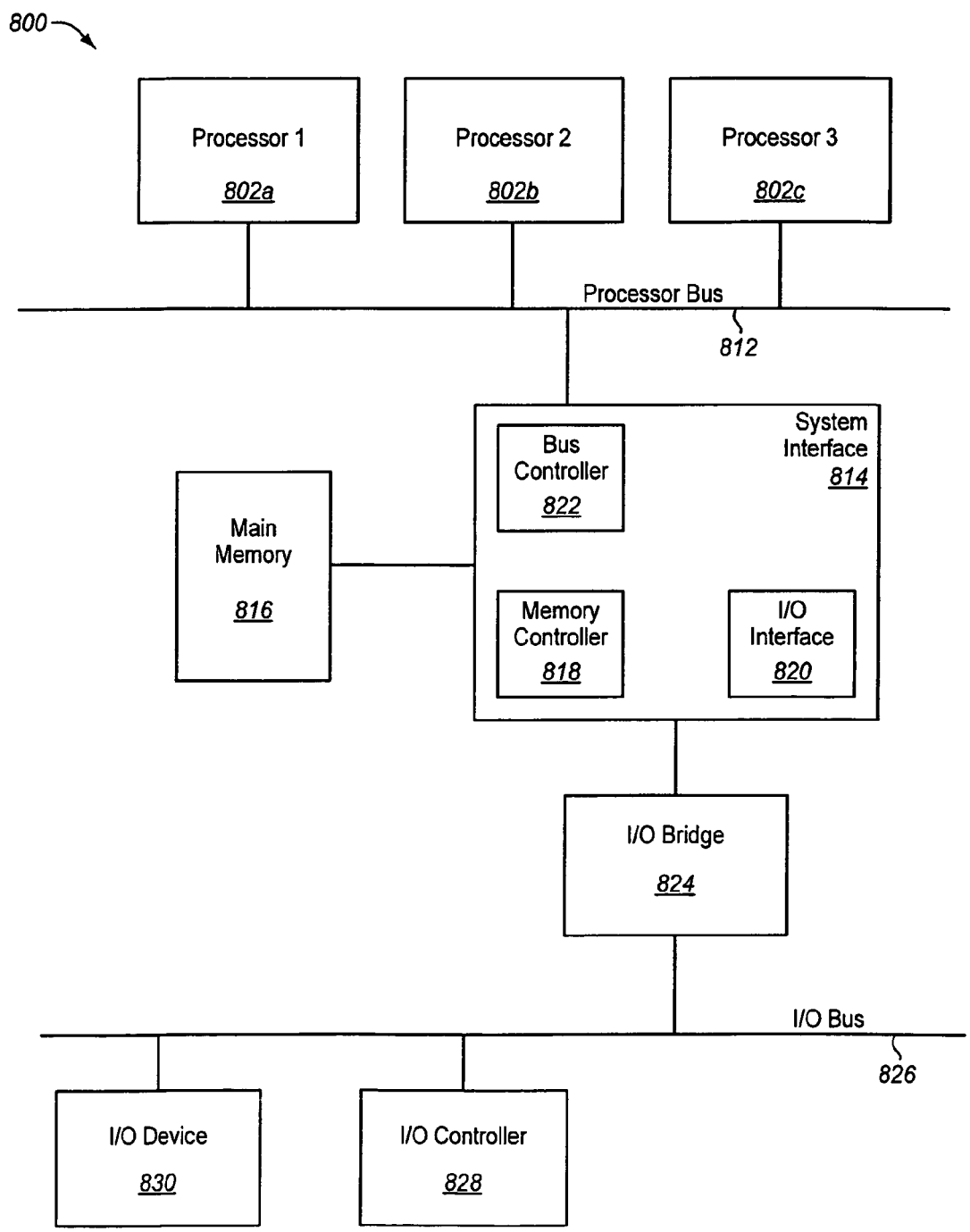
FIG. 8 illustrates a block diagram of one embodiment of a computer system.

FIG. 8 is a block diagram illustrating an exemplary computer system (system) 800 used in implementing one or more embodiments of the invention. Some components of FIG. 1 may be implemented as system 800 or as components of system 800. System 800 includes one or more processors 802a-c. The processors 802a-c may include one or more single-threaded or multi-threaded processors. A typical multi-threaded processor may include multiple threads or logical processors, and may be capable of processing multiple instruction sequences concurrently using its multiple threads.

Processors 802a-c may also include one or more internal levels of cache and a bus controller or bus interface unit to direct interaction with the processor bus 812. As in the case of chip multiprocessors or multi-core processors, processors 802a-c may be on the same chip. The chip may include shared caches, interprocessor connection networks, and special hardware support such as those for SPT execution (not shown). Furthermore, processors 802a-c may include multiple processor cores. Processor bus 812, also known as the host bus or the front side bus, may be used to couple the processors 802a-c with the system interface 814.

System interface 814 (or chipset) may be connected to the processor bus 812 to interface other components of the system 800 with the processor bus 812. For example, system interface 814 may include a memory controller 818 for interfacing a main memory 816 with the processor bus 812. The main memory 816 typically includes one or more memory cards and a control circuit (not shown). System interface 814 may also include an input/output (I/O) interface 820 to interface one or more I/O bridges or I/O devices with the processor bus 812. For example, as illustrated, the I/O interface 820 may interface an I/O bridge 824 with the processor bus 812. I/O bridge 824 may operate as a bus bridge to interface between the system interface 814 and an I/O bus 826. One or more I/O controllers and/or I/O devices may be connected with the I/O bus 826, such as I/O controller 828 and I/O device 830, as illustrated. I/O bus 826 may include a peripheral component interconnect (PCI) bus or other type of I/O bus.

System 800 may include a dynamic storage device, referred to as main memory 816, or a random access memory (RAM) or other devices coupled to the processor bus 812 for storing information and instructions to be executed by the processors 802a-c. Main memory 816 may also be used for storing temporary variables or other intermediate information during execution of instructions by the processors 802a-c. System 800 may include a read only memory (ROM) and/or other static storage device coupled to the processor bus 812 for storing static information and instructions for the processors 802a-c.

Main memory 816 or dynamic storage device may include a magnetic disk or an optical disc for storing information and instructions. I/O device 830 may include a display device (not shown), such as a cathode ray tube (CRT) or liquid crystal display (LCD), for displaying information to an end user. I/O device 830 may also include an input device (not shown), such as an alphanumeric input device, including alphanumeric and other keys for communicating information and/or command selections to the processors 802a-c. Another type of user input device includes cursor control, such as a mouse, a trackball, or cursor direction keys for communicating direction information and command selections to the processors 802a-c and for controlling cursor movement on the display device.

System 800 may also include a communication device (not shown), such as a modem, a network interface card, or other well-known interface devices, such as those used for coupling to Ethernet, token ring, or other types of physical attachment for purposes of providing a communication link to support a local or wide area network, for example. Stated differently, the system 800 may be coupled with a number of clients and/or servers via a conventional network infrastructure, such as a company's intranet and/or the Internet, for example.

It is appreciated that a lesser or more equipped system than the example described above may be desirable for certain implementations. Therefore, the configuration of system 800 may vary from implementation to implementation depending upon numerous factors, such as price constraints, performance requirements, technological improvements, and/or other circumstances.

Embodiments of the invention provide a variety of advantages over the current state of the art. One advantage is the correct enablement of the state-based APC model usage. Embodiments address the issue of re-measurements and data invalidation that current state-based approaches do not address. This is critical in the semiconductor area for robust model updates. Embodiments of the invention also enable state-based APC models to accurately track process drifts by ordering the updates in the order in which lots were processed.

Embodiments of the invention also provide for increased tool throughput time. In addition, another advantage is the reduction in APC application delivery time and enhanced APC capabilities. State-based models enable the move to a "configuration only" based APC application environment versus the current scripting one. This will speed up the delivery of APC applications. State-based models also enable implementation of enhanced capabilities (e.g., on-line tuning of the EWMA parameter).

It should be noted that, while the embodiments described herein may be performed under the control of a programmed processor, such as processors 802a-c, in alternative embodiments, the embodiments may be fully or partially implemented by any programmable or hard coded logic, such as field programmable gate arrays (FPGAs), transistor transistor logic (TTL) logic, or application specific integrated circuits (ASICs). Additionally, the embodiments of the invention may be performed by any combination of programmed general-purpose computer components and/or custom hardware components. Therefore, nothing disclosed herein should be construed as limiting the various embodiments of the invention to a particular embodiment wherein the recited embodiments may be performed by a specific combination of hardware components.

In the above description, numerous specific details such as logic implementations, opcodes, resource partitioning, resource sharing, and resource duplication implementations, types and interrelationships of system components, and logic partitioning/integration choices may be set forth in order to provide a more thorough understanding of various embodiments of the invention. It will be appreciated, however, to one skilled in the art that the embodiments of the invention may be practiced without such specific details, based on the disclosure provided. In other instances, control structures, gate level circuits and full software instruction sequences have not been shown in detail in order not to obscure the invention. Those of ordinary skill in the art, with the included descriptions, will be able to implement appropriate functionality without undue experimentation.

The various embodiments of the invention set forth above may be performed by hardware components or may be embodied in machine-executable instructions, which may be used to cause a general-purpose or special-purpose processor or a machine or logic circuits programmed with the instructions to perform the various embodiments. Alternatively, the various embodiments may be performed by a combination of hardware and software.

Various embodiments of the invention may be provided as a computer program product, which may include a machine-readable medium having stored thereon instructions, which may be used to program a computer (or other electronic devices) to perform a process according to various embodiments of the invention. The machine-readable medium may include, but is not limited to, floppy diskette, optical disk, compact disk-read-only memory (CD-ROM), magneto-optical disk, read-only memory (ROM) random access memory (RAM), erasable programmable read-only memory (EPROM), electrically erasable programmable read-only memory (EEPROM), magnetic or optical card, flash memory, or another type of media/machine-readable medium suitable for storing electronic instructions. Moreover, various embodiments of the invention may also be downloaded as a computer program product, wherein the program may be transferred from a remote computer to a requesting computer by way of data signals embodied in a carrier wave or other propagation medium via a communication link (e.g., a modem or network connection).

Similarly, it should be appreciated that in the foregoing description, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims, which in themselves recite only those features regarded as the invention.

What is claimed is:

1. A method, comprising:
receiving at least one of a re-measurement or a data invalidation at a state-based advanced process control (APC) model;
referencing a state value table and a state update table to determine a current state of lot measurements in the state-based APC model;
updating the state value table and the state update table to reflect the at least one of the re-measurement or the data invalidation; and
determining settings to apply to a lot at a process tool based on process variability patterns established by the state-based APC model from the updated values in the state value table and the state update table.

2. The method of claim 1, wherein the updating is synchronous so that an order of lots in the state value table and the state update table is in the order of processing of the lots at the process tool.

3. The method of claim 1, wherein the updating is asynchronous so that an order of lots in the state value table and the state update table is in an order of metrology measurement of the lots performed at a metrology tool.

4. The method of claim 1, further comprising accounting for manual updates by discarding all history of lot measurements in order to disregard the lot measurements for determining the settings.

5. The method of claim 1, wherein an exponentially weighted moving average (EWMA) calculation is applied to determine the process variability patterns.

6. The method of claim 5, wherein the EWMA calculation is made as part of a high volume feedback path in the state-based APC model.

7. The method of claim 1, wherein the determining the settings is performed by a model inversion module.

8. The method of claim 1, wherein the state-based APC model is capable of tracking different partitioning structures based on different components of variation.

9. An apparatus, comprising:
a metrology tool to perform at least one of a re-measurement or a data invalidation;
an updater of a state-based advanced process control (APC) module to:
reference a state value table and a state update table of the state-based APC module to determine a current state of lot measurements; and
update the state value table and the state update table to reflect the at least one of the re-measurement or the data invalidation;
a model calculation and update module to determine process variability patterns of the lot measurements based on the updated values in the state value table and the state update table; and
a model inversion module to determine settings to apply to a lot at a process tool based on the process variability patterns.

10. The apparatus of claim 9, wherein the state-based APC module updates are synchronous so that an order of lots in the state value table and the state update table is in the order of processing of the lots at the process tool.

11. The apparatus of claim 9, wherein the state-based APC module updates are asynchronous so that an order of lots in the state value table and the state update table is in an order of metrology measurement of the lots performed at a metrology tool.

12. The apparatus of claim 9, wherein the state-based APC module further comprises:

one or more buffers to store entries from the state value table and state update table to assist the updater in the updating of the state value table and state update table; and a manual update detector to account for manual updates by discarding all history of lot measurements in order to disregard the lot measurements for determining the settings.

13. The apparatus of claim 9, wherein the model calculation and update module applies an exponentially weighted moving average (EWMA) calculation to determine the process variability patterns.

14. The apparatus of claim 9, wherein the state-based APC model is capable of tracking different partitioning structures based on different components of variation.

15. An article of manufacture comprising a machine-readable medium including data that, when accessed by a machine, cause the machine to perform operations comprising:

receiving at least one of a re-measurement or a data invalidation at a state-based advanced process control (APC) model;

referencing a state value table and a state update table to determine a current state of lot measurements in the state-based APC model;

updating the state value table and the state update table to reflect the at least one of the re-measurement or the data invalidation; and determining settings to apply to a lot at a process tool based on process variability patterns established by the state-based APC model from the updated values in the state value table and the state update table.

16. The article of manufacture of claim 15, wherein the updating is synchronous so that an order of lots in the state value table and the state update table is in the order of processing of the lots at the process tool.

17. The article of manufacture of claim 15, wherein the updating is asynchronous so that an order of lots in the state value table and the state update table is in an order of metrology measurement of the lots performed at a metrology tool.

18. The article of manufacture of claim 15, further comprising accounting for manual updates by discarding all history of lot measurements in order to disregard the lot measurements for determining the settings.

19. The article of manufacture of claim 15, wherein an exponentially weighted moving average (EWMA) calculation is applied to determine the process variability patterns.

20. The article of manufacture of claim 15, wherein the determining the settings is performed by a model inversion module.

* * * * *